United States Patent [19]
Yang

[11] Patent Number: 5,160,868
[45] Date of Patent: Nov. 3, 1992

[54] ADJUSTABLE BRUSH AC/DC SERVO MOTOR

[76] Inventor: Tai-Her Yang, 5-1 Taipin St., Si-Hu Town, Dzan-Hwa, Taiwan

[21] Appl. No.: 599,742

[22] Filed: Oct. 19, 1990

[51] Int. Cl.[5] .................... H02K 13/10; H02K 23/18
[52] U.S. Cl. ................................. 310/230; 310/220
[58] Field of Search .................. 310/114, 230, 220

[56] References Cited

U.S. PATENT DOCUMENTS

| | | | |
|---|---|---|---|
| 2,414,523 | 1/1947 | Harding et al. | 310/230 UX |
| 4,308,400 | 12/1981 | Moody | 310/230 |
| 4,959,578 | 9/1990 | Varga | 310/114 |

Primary Examiner—Steven L. Stephan
Assistant Examiner—C. LaBalle
Attorney, Agent, or Firm—Leonard Bloom

[57] ABSTRACT

An adjustable-brush motor incorporates an integral stepping motor or servo to electromechanically adjust the commutating angle of the primary brushes by input of an electrical signal, and to maintain a predetermined commutating angle in the absence of an electrical signal. The adjustment is in accordance with load changes to reduce sparking, to upgrade the electromechanical conversion efficiency of the motor, and to reverse the direction of rotation.

18 Claims, 2 Drawing Sheets

ADJUSTABLE BRUSH AC/DC SERVO MOTOR

BACKGROUND OF THE INVENTION

1. Field of the invention

The present invention relates to an adjustable-brush electric machine having a variable commutating angle, and more particularly, to a motor incorporating a stepping motor or servo for electromechanically adjusting the brushes.

2. Description of the Background

It is well-known that the commutating angle of an electric machine can be altered by rotating the brushes relative to the commutator. This concept can be implemented to reduce sparking at the brushes due to sudden load changes. In addition, it is a convenient technique for reversing the direction of rotation of the motor. However, the rotation of the motor makes it quite difficult to implement an accurate means for shifting the brush position relative to the commutator.

SUMMARY OF THE INVENTION

It is, therefore, an object of the present invention to provide an adjustable-brush type ac/dc servo or stepping motor with series, parallel or combination field windings.

It is another object of the invention to provide an adjustable-brush motor incorporating an integral stepping motor or servo for electromechanically adjusting the commutating angle by input of an electrical signal, and for maintaining a predetermined commutating angle in the absence of an electrical signal.

It is yet another object of the invention to provide an adjustable-brush motor which can be applied as DC concatenated motor or DC shunt motor or AC compulsion motor, and which allows adjustment of the brushes to minimize sparks produced by armature reaction and to upgrade the electromechanical conversion efficiency of the motor.

It is yet another object of the present invention to change the motor's driving direction, and to stop the motor by use of the above-described means for adjusting the commutating angle.

It is a further object of the present invention to combine the above-described stepping or servo motor in a co-axial and integral relation to the prime mover itself.

According to the present invention, the above-described and other objects are accomplished by providing an adjustable-brush ac/dc servo motor. The adjustable-brush motor comprises a first electric motor having a drive-shaft wound with a primary armature winding, a commutator mounted on the drive-shaft and electrically connected to the primary armature winding, a stator wound with a primary field winding for exciting the primary armature winding, and an electrically-adjustable brush assembly for maintaining conductive contact with the commutator during rotation.

The adjustable-brush assembly comprises a second electric motor which is preferably a servo or stepping-motor for establishing and maintaining a predetermined angular displacement of the brushes with respect to the commutator to improve electromechanical energy conversion efficiency, reduce sparking at the primary brushes, and to reverse rotation of the drive-shaft. Alternatively, the adjustable-brush assembly may include dual servos or stepping-motors, each being dedicated to adjust the commutating angle in a particular direction.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE INVENTION

Figure 1:
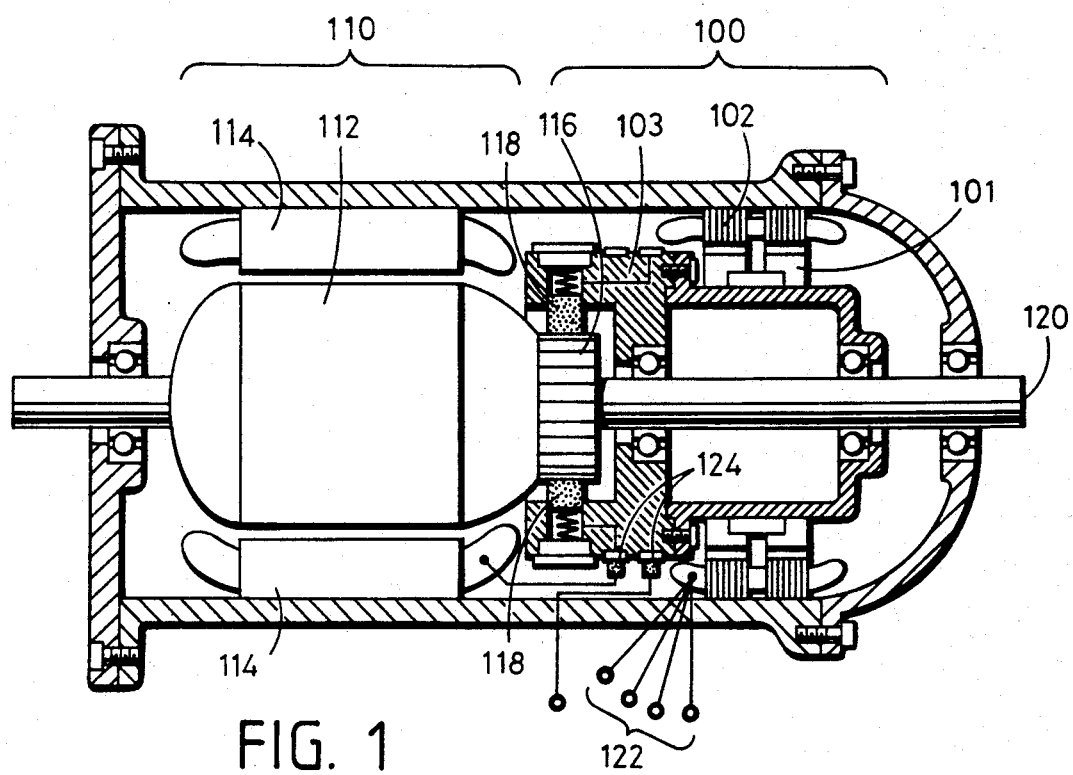
FIG. 1 is a perspective drawing of the electric structure of an adjustable brush ac/dc servo motor according to one embodiment of the present invention.

As illustrated in FIG. 1, the adjustable brush ac/dc servo motor according to the present invention comprises a conventional primary motor assembly 110 which includes an armature having armature windings 112 wound on a drive-shaft 120, and opposing field windings 114 for generating a magnetomotive force to turn drive-shaft 120. The invention also comprises an adjustable brush assembly 100 for controlling the commutating angle of brushes 118. The primary field windings 114 may be connected serially with brushes 118, or may be connected in parallel therewith for controlling ac or dc power.

In addition, a central control unit (not shown) may be provided to allow manual control of adjustable brush assembly 100, automatic control via software, or any other known type of control.

Adjustable brush assembly 100 further comprises a stepping (or servo) motor which carries brushes 118 in rotatable relation to commutator 116. This allows adjustment of the angular displacement of the brushes 118 relative to commutator 116 to correct the angle of commutation in accordance with varying load conditions, and also to change the direction of motor rotation or speed by means of changing the commutating angle.

As illustrated in FIG. 1, the stepping (or servo) motor of the adjustable brush assembly 100 includes a rotor 101 rotatably mounted on drive-shaft 120 and carrying peripheral magnets. Also included are a stator with stationary stepped-field windings 102. The rotor 101 is provided with brush sockets 103 which function to retain the brushes 118 within rotor 101. Each of the stepped field windings 102 are individually accessible over leads 122.

In accordance with conventional stepping-motors, electrical signals such as pulses are sequentially applied to leads 122 to incrementally rotate brushes 118. Hence, by applying a predetermined sequence of pulses, brushes 118 can be positioned in any desired angular relation with respect to commutator 116. When no pulses are applied, the stepping-motor will maintain the brushes 118 in the present position.

Secondary brushes 124 may be provided to allow external electrical contact with brushes 118 and primary field windings 114, respectively. The invention may be configured as a series, parallel or combination motor by alternative wiring of secondary brushes 224.

Figure 2:
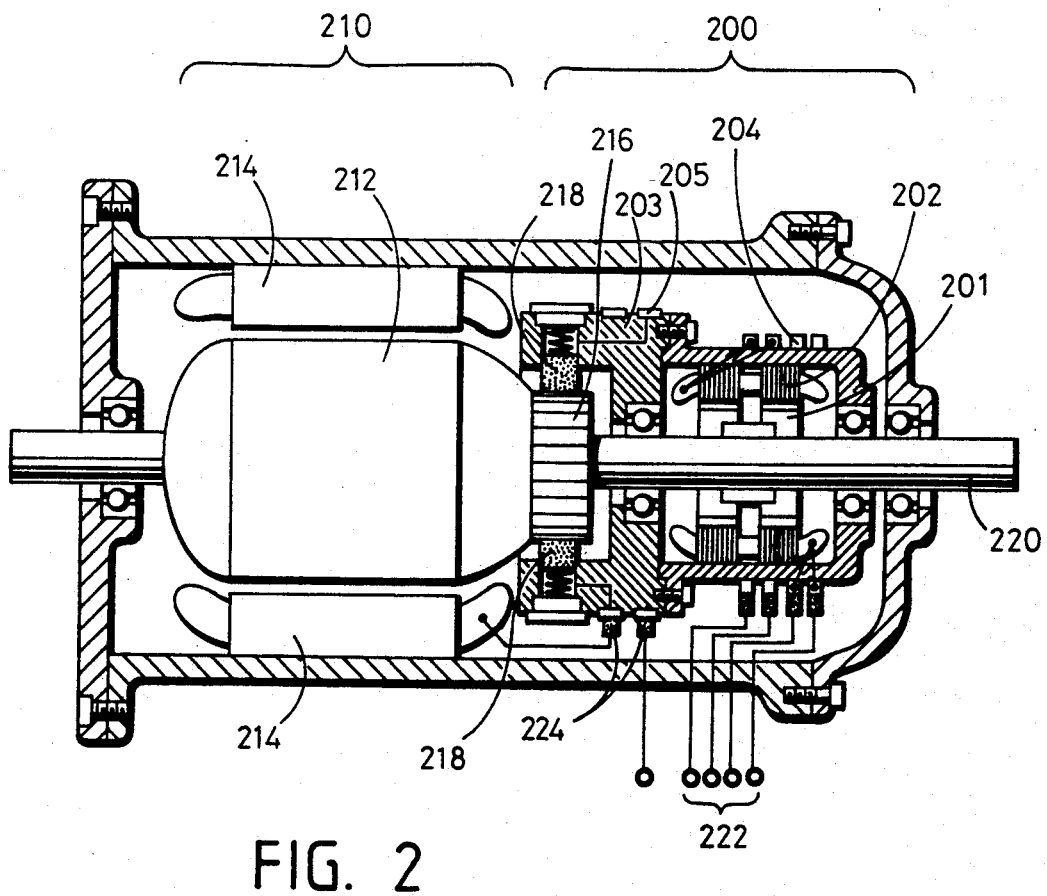
FIG. 2 is a perspective drawing showing the structure of an adjustable-brush ac/dc servo motor according to a second embodiment of the present invention.

An alternative embodiment of the present invention is shown in FIG. 2. The embodiment of FIG. 2 also comprises a conventional primary motor assembly 210 which includes an armature having armature windings 212 wound on a drive-shaft 220, and opposing primary field windings 214 for generating a magnetomotive force to turn drive-shaft 220. The embodiment of FIG. 2 operates according to the same principle as that of FIG. 1. However, the adjustable-brush assembly 200 incorporates non-stationary secondary field windings 202.

The adjustable brush assembly 200 is equipped with a squirrel-cage type rotor comprising a housing 203 rotatably mounted on drive-shaft 220, and a plurality of stepped field windings attached to the inner periphery of the rotor housing. Adjustable brush assembly 200 also includes a permanent magnet (or, alternatively, electromagnet) mounted on drive-shaft 220 for generating a magnetomotive force relative to stepped field windings 202.

The primary field windings 214 may be connected serially with brushes 218, or may be connected in parallel therewith for controlling ac or dc power.

Likewise, a central control unit (not shown) may be provided to allow manual control of adjustable brush assembly 200, or automatic control via software or other known adjusting means. The brushes 216 are carried in rotatable relation to commutator 216 by the co-axial squirrel-cage rotor 203. This allows angular adjustment of the brushes 218 relative to commutator 216.

In the embodiment of FIG. 2, stepped field windings 222 are individually accessible to allow incremental operation of the adjustable brush assembly 200 in accordance with a sequence of electrical signals such as pulses. For this, the input pulses are received through secondary brushes 226 and conductive rings 204 which establish electrical contact with each of the stepped field windings 202.

Figure 3:
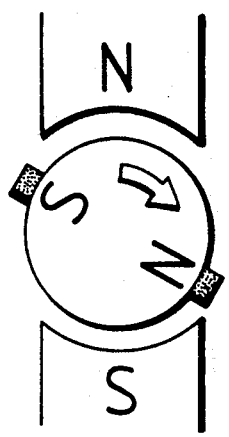
FIG. 3 is a descriptive drawing showing the adjustment of the commutating angle in accordance with the present invention.
Figure 4:
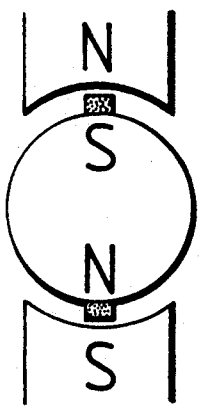
FIG. 4 is a descriptive drawing showing the return adjustment to a balanced state from the position described in FIG. 3

We may utilize the above-described embodiments to control the commutating angle between the primary brushes and commutator for correcting unbalanced angular magnetic poles to a newly balanced condition. FIG. 3 and FIG. 4 illustrate this sequential procedure.

Figure 5:
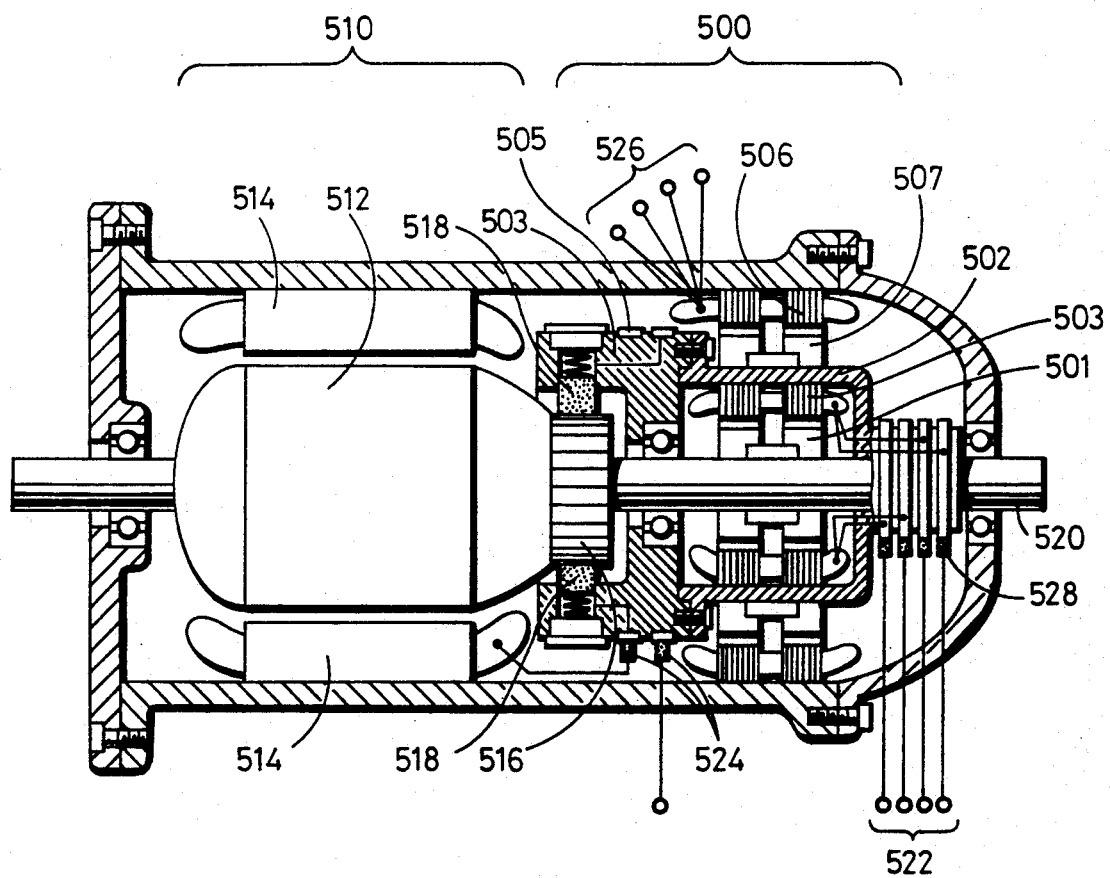
FIG. 5 is a perspective drawing of an adjustable-brush ac/dc motor incorporating dual servos in accordance with a third embodiment of the present invention.

FIG. 5 illustrates a third embodiment of the invention which incorporates dual stepping or servo motors for control of angular displacement. As shown, the adjustable brush assembly 500 of FIG. 5 comprises an inner stepping or servo motor including a squirrel-cage type rotor 502 rotatably mounted on drive-shaft 520. Rotor 502 is provided with stepped field windings 503 mounted on its inner periphery. When excited, stepped field windings 503 generate a magnetomotive force in conjunction with opposing magnets (or coils) 501, thereby causing rotation of rotor 502. Preferably, stepped field windings 503 are configured to cause unidirectional angular rotation of rotor 502. Likewise, magnets (or coils) 507 are mounted on the outer periphery of rotor 502 opposite stepped field windings 506 to induce rotation in the opposite direction. Stepped field windings 506 are stationary, and may be mounted alongside primary field windings 514 on a main housing. In the embodiment of FIG. 5 stepped field windings 503 are individually accessible to allow incremental operation of the inner stepping motor in accordance with a sequence of electrical signals such as pulses. For this, the input pulses are received through secondary brushes 528 and conductive rings 504 which establish rotating electrical contact to each of the stepped field windings 503.

In addition, a central control unit (not shown) may be coupled to leads 522 to allow manual control of adjustable brush assembly 500, automatic control via software, or other known type of control.

In FIG. 5, the dual stepping or servo motors shown in the illustrated embodiment can be operated to respectively rotate the brushes 516 in a positive or negative direction.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. For instance, the precise number of poles produced by the field and armature windings may vary in accordance with the intended motor application to create any desired magnetomotive differential. It is to be understood, therefore, that within the scope of the appended claims, the invention may be practiced otherwise than as specifically set forth herein.

What is claimed is:

1. An adjustable-brush electric motor, comprising:
a first rotary electric motor including a drive-shaft wound with a primary armature winding, a commutator mounted on said drive-shaft and electrically connected to said primary armature winding, a stator wound with a primary field winding for exciting said drive shaft to rotate, and an electrically-adjustable brush assembly for maintaining conductive contact with said commutator during rotation thereof, said electrically-adjustable brush assembly further comprising a second rotary electric motor supported on the drive-shaft of said first electric motor for maintaining an angular displacement of said brush assembly with respect to said commutator to improve electromechanical energy conversion efficiency, reduce sparking at said brush assembly, and to reverse rotation of said drive-shaft.

2. The adjustable-brush electric motor according to claim 1, wherein said second electric motor is a stepping motor.

3. The adjustable-brush electric motor according to claim 2, further comprising a central processing unit for electrically adjusting said brush assembly by controlling said stepping motor.

4. An adjustable-brush electric motor, comprising:
a first rotor including a drive-shaft wound with a primary armature winding;
a commutator mounted on said drive-shaft and electrically connected to said primary armature winding;
a stator wound with a primary field winding for exciting said first rotor;
an electrically-adjustable brush assembly for maintaining conductive contact with said commutator during rotation thereof, said brush assembly further comprising,
a plurality of primary brushes in conductive contact with said commutator, conducting means for conducting power to said primary brushes for excitation of said primary armature windings, and a stepping motor for maintaining an angular displacement of said primary brushes with respect to said commutator, said stepping motor including a second rotor rotatably mounted on said drive-shaft and carrying said primary brushes, a plurality of stepped-field windings for exciting said second rotor, and means for applying electrical signals to each one of said stepped-field windings;

wherein an electrical signal applied to at least one of said stepped-field windings angularly positions said second rotor and primary brushes with respect to said drive-shaft and commutator, respectively, for improving electromechanical energy conversion efficiency, reducing sparking at said primary brushes, and reversing rotation of said first rotor.

5. The adjustable-brush electric motor according to claim 4, further comprising a central processing unit for electrically adjusting said brush assembly.

6. The adjustable-brush electric motor according to claim 4, wherein said conducting means further comprises an electrical connection between said primary brushes and said second rotor, and at least one secondary brush for allowing external connection to said second rotor during rotation thereof.

7. The adjustable-brush electric motor according to claim 6, wherein said conducting means further comprises a pair of secondary brushes for allowing external connection to said second rotor, and for allowing connection between said primary field winding and said second rotor during rotation of said second rotor.

8. An adjustable-brush electric motor, comprising:
a first rotor including a drive-shaft wound with a primary armature winding;
a commutator mounted on said drive-shaft and electrically connected to said primary armature winding;
a stator wound with a primary field winding for exciting said first rotor;
an electrically-adjustable brush assembly for maintaining conductive contact with said commutator during rotation thereof, said brush assembly further comprising,
a plurality of primary brushes in conductive contact with said commutator,
conducting means for conducting power to said primary brushes for excitation of said primary armature windings,
a stepping motor for maintaining an angular displacement of said primary brushes with respect to said commutator, said stepping motor including magnetic means mounted on said drive-shaft, a squirrel-cage rotatably mounted on said drive-shaft and carrying said primary brushes, a plurality of stepped-field windings mounted within said squirrel-cage for inducing reluctance with said magnetic means on said drive-shaft, and means for applying electrical signals to each one of said stepped-field windings;

whereby an electrical signal applied to at least one of said stepped-filed windings angularly positions said squirrel-cage and primary brushes with respect to said drive-shaft and commutator, respectively, for improving electromechanical energy conversion efficiency, reducing sparking at said primary brushes, and reversing rotation of said first rotor.

9. The adjustable-brush electric motor according to claim 8, further comprising a central processing unit for electrically adjusting said brush assembly.

10. The adjustable-brush electric motor according to claim 8, wherein said conducting means further comprises an electrical connection between said primary brushes and said second rotor, and at least one secondary brush for allowing external connection to said second rotor during rotation thereof.

11. The adjustable-brush electric motor according to claim 10, wherein said conducting means further comprises a pair of secondary brushes for allowing external connection to said second rotor, and for allowing connection between said primary field winding and said second rotor during rotation of said second rotor.

12. The adjustable-brush electric motor according to claim 8, wherein said means for applying electrical signals to each one of said stepped-field windings comprises a plurality of conductive rings around said squirrel-cage each connected to a stepped-field winding, and a corresponding plurality of secondary brushes each providing an external connection to one of said rings.

13. An adjustable-brush electric motor, comprising:
a first rotor including a drive-shaft wound with a primary armature winding;
a commutator mounted on said drive-shaft and electrically connected to said primary armature winding;
a commutator mounted on said drive-shaft and electrically connected to said primary armature winding;
a stator wound with a primary field winding for exciting said first rotor;
an electrically-adjustable brush assembly for maintaining conductive contact with said commutator during rotation thereof, said brush assembly further comprising,
a plurality of primary brushes in conductive contact with said commutator,
conducting means for conducting power to said primary brushes for excitation of said primary armature windings,
dual stepping motors for maintaining an angular displacement of said primary brushes with respect to said commutator, said dual stepping motors including a first magnetic means mounted on said drive-shaft, a squirrel-cage rotatably mounted on said drive-shaft and carrying said primary brushes, a plurality of first stepped-field windings mounted on an inner periphery of said squirrel-cage for inducing reluctance with said first magnetic means on said drive-shaft, means for applying electrical signals to each one of said first stepped-field windings, second magnetic means mounted on an outer periphery of said squirrel cage, a plurality of second stepped-field windings mounted on said stator for inducing reluctance with said second magnetic means, means for applying electrical signals to each one of said first stepped-field windings, and means for applying electrical signals to each one of said second stepped-field windings;

whereby an electrical signal applied to at least one of said first stepped-field windings angularly positions with squirrel-cage and primary brushes in one direction with respect to said drive-shaft and commutator, respectively, and an electrical signal applied to at least one of said second stepped-field windings angularly positions said squirrel-cage and primary brushes in another direction with respect to said drive-shaft and commutator, respectively, for improving electromechanical energy conversion efficiency, reducing sparking at said primary brushes, and reversing rotation of said first rotor.

14. The adjustable-brush electric motor according to claim 13, further comprising a central processing unit for electrically adjusting said brush assembly.

15. The adjustable-brush electric motor according to claim 13, wherein said conducting means further comprises an electrical connection between said primary brushes and said second rotor, and at least one secondary brush for allowing external connection to said second rotor during rotation thereof.

16. The adjustable-brush electric motor according to claim 15, wherein said conducting means further comprises a pair of secondary brushes for allowing external connection to said second rotor, and for allowing connection between said primary field winding and said second rotor during rotation of said second rotor.

17. The adjustable-brush electric motor according to claim 13, wherein said means for applying electrical signals to each one of said first stepped-field windings comprises a plurality of conductive rings around said drive-shaft each connected to one of said first stepped-field windings, and a corresponding plurality of secondary brushes each providing an external connection to one of said rings.

18. An adjustable-brush electric motor, comprising:
a first electric motor including a drive-shaft wound with a primary armature winding, a commutator mounted on said drive-shaft and electrically connected to said primary armature winding, a stator wound with a primary field winding for exciting said drive shaft, and an electrically-adjustable brush assembly for maintaining conductive contact with said commutator during rotation thereof, said electrically-adjustable brush assembly further comprising a second electric stepping-motor and a central processing unit for controlling said stepping motor to maintain a step-wise angular displacement of said brush assembly with respect to said commutator to improve electromechanical energy conversion efficiency, reduce sparking at said brush assembly, and to reverse rotation of said drive-shaft.

* * * * *